(12) United States Patent
Touchton et al.

(10) Patent No.: US 7,709,136 B2
(45) Date of Patent: May 4, 2010

(54) BATTERY PACK ASSEMBLY

(75) Inventors: Scott F. Touchton, Pottstown, PA (US); Edward P. Cheslock, Delta, PA (US)

(73) Assignee: Perimeter Technologies Incorporated, Morgantown, PA (US)

( * ) Notice: Subject to any disclaimer, the term of this patent is extended or adjusted under 35 U.S.C. 154(b) by 1159 days.

(21) Appl. No.: 11/174,245

(22) Filed: Jul. 1, 2005

(65) Prior Publication Data

US 2007/0003825 A1  Jan. 4, 2007

(51) Int. Cl.
*H01M 2/10* (2006.01)
(52) U.S. Cl. .............................. 429/96; 429/97; 429/100
(58) Field of Classification Search .................. 429/97, 429/100, 96; 206/703; 361/679.01
See application file for complete search history.

(56) References Cited

U.S. PATENT DOCUMENTS

| | | | |
|---|---|---|---|
| 5,445,900 A * | 8/1995 | Miller et al. ................... | 429/1 |
| 5,460,124 A | 10/1995 | Grimsley et al. ............ | 119/721 |
| 5,476,729 A | 12/1995 | Miller, Jr. et al. ............... | 429/1 |
| 5,827,619 A * | 10/1998 | Iida ............................... | 429/1 |

* cited by examiner

*Primary Examiner*—Raymond Alejandro
(74) *Attorney, Agent, or Firm*—Wood, Herron & Evans, L.L.P.

(57) ABSTRACT

A battery pack assembly is provided for supplying electrical power to an electronic device, such as an electronic receiver of an animal confinement system. The battery pack assembly is removably insertable within a receptacle of the electronic receiver to electrically connect a battery contained within the battery pack assembly to internal electronics of the electronic receiver.

37 Claims, 5 Drawing Sheets

BATTERY PACK ASSEMBLY

FIELD OF THE INVENTION

The present invention relates generally to battery devices for supplying electrical power and, more particularly, to a removable battery pack assembly for supplying electrical power to an electronic device.

BACKGROUND OF THE INVENTION

Removable battery pack assemblies are commonly used with electronic devices to provide electrical power from a battery to electronic circuitry of the device. Typical battery pack assemblies may contain a standard lithium cell battery therein which, over time, may need to be removed from the electronic device and replaced. The electronic device typically includes a receptacle which is configured to receive the battery pack assembly therein. When fully inserted into the receptacle, the battery pack assembly facilitates electrical contact between the battery and the internal electronics within the electronic device.

Battery pack assemblies are oftentimes used in animal confinement systems, for example. In such systems, a battery-powered electronic receiver is worn by an animal and is responsive to a boundary signal emitted from a transmitter of the animal confinement system. The electronic receiver is designed to generate a stimulus, such as an electrical shock, when the boundary signal is received by the electronic receiver. The boundary signal operates to confine an animal within the boundary defined by the boundary signal.

One known electronic receiver that incorporates a removable battery pack assembly into the receiver is disclosed in U.S. Pat. No. 5,445,900. The electronic receiver disclosed therein includes a receptacle that is configured to receive the battery pack assembly therein to provide electrical contact between a battery contained within the battery pack assembly and the internal electronics of the electronic receiver.

The battery pack assembly disclosed in U.S. Pat. No. 5,445,900 includes a battery housing having an open end through which the battery is inserted and an opposite closed end. A contactor is mounted within the battery housing and includes a pair of contact arms that are connected to a common flexion spring. The flexion spring electrically contacts one terminal of the battery, such as the battery anode, at the closed end of the battery housing and provides electrical contact with the anode terminal of the battery through the pair of contact arms that extend outwardly from the open end of the battery housing. A retaining ring is attached to the open end of the battery housing to retain the battery and the contactor within the battery housing. The retaining ring has a central aperture so that the opposite terminal of the battery, i.e., the battery cathode, is exposed outside of the battery housing at the open end. When the battery pack assembly is inserted into the receptacle, the contact arms of the contactor and the cathode terminal of the battery are electrically connected to electrical terminals of the electronic receiver that extend into the receptacle of the receiver.

One potential drawback of this known battery pack assembly is that the cathode terminal of the battery is directly exposed to the environment outside of the battery housing. Over a period of extended use, this may result in the cathode terminal of the battery becoming damaged or corroded, thereby leading to a potentially shortened useful life of the battery. Also, due to the design of the single flexion spring, it is possible that the flexion spring may lose its flexing ability over an extended period of use which may result in an undesirable loss of electrical contact between the battery and the internal electronics of the electronic receiver.

Accordingly, there is a need for an improved battery pack assembly that overcomes these and other drawbacks and shortcomings of known battery pack assemblies.

SUMMARY OF THE INVENTION

The present invention overcomes the foregoing and other shortcomings and drawbacks of the battery pack assembly heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a removable battery pack assembly is provided to supply electrical power to an electronic device. In one embodiment of the present invention, the electronic device is an electronic receiver carried by an animal in an animal confinement system. One example of such an electronic receiver is disclosed in U.S. Pat. No. 5,445,900 to which the reader is referred and which is incorporated herein by reference. The battery pack assembly contains a battery therein, such as a standard lithium cell battery, which is electrically connected to the internal electronics of the receiver when the battery pack assembly is fully installed within a receptacle of the receiver. The battery pack assembly is configured to be inserted into the receptacle of the electronic receiver and then rotated therein to secure the battery pack assembly within the receptacle.

In one embodiment, the receptacle of the electronic receiver includes a pair of generally L-shaped guide grooves provided in a tubular wall of the receptacle. The guide grooves are configured to receive and guide a pair of diametrically opposed lugs that extend radially outwardly from the battery pack assembly. The guide grooves include detents that extend partially into the guide grooves. The detents cooperate with the lugs to retain the battery pack assembly following full insertion and rotation of the battery pack assembly within the receptacle.

The battery pack assembly of the present invention includes a battery housing having an open end through which the battery is inserted into the housing and a generally closed opposite end. In one embodiment, a pair of generally L-shaped contact members are located within the battery housing and have respective contact ends that extend outwardly of the battery housing adjacent the closed end of the housing. The contact members are configured to contact one terminal of the battery adjacent the open end, such as the battery anode, and provide electrical contact with the anode terminal of the battery from outside the battery housing adjacent the closed end through the outwardly extending contact ends of the contact members.

The battery pack assembly also includes a flexible contact member, such as a spring, positioned at the closed end of the battery housing. The flexible contact member is configured to electrically contact the opposite terminal of the battery, such as the battery cathode, adjacent the closed end. The flexible contact member is also configured to bias the battery toward the open end of the battery housing such that the opposite terminal of the battery, e.g., the battery anode, is urged into electrical contact with the pair of generally L-shaped contact members.

A spring seat is provided in the closed end of the battery housing that is configured to mount the flexible contact member. The spring seat includes an opening through the closed end of the battery housing. The flexible contact member is mounted within the spring seat such that a portion of the flexible contact member extends generally through the opening to provide electrical contact with the cathode terminal of the battery from outside the battery housing. The flexible contact member effectively closes the opening such that the cathode terminal of the battery is not directly exposed outside of the battery housing. The pair of generally L-shaped contact members and the flexible contact member are configured to electrically contact respective electrical contacts of the electronic receiver that extend into the receptacle of the electronic receiver. In this way, the battery is operable to provide electrical power to the internal electronics of the electronic receiver.

The battery pack assembly is provided with a cap that is sized to cover the open end of the battery housing and extend radially beyond a tubular wall of the battery housing. The cap may be permanently connected to the battery housing or, alternatively, the cap may be removable. The cap holds the pair of L-shaped contact members in electrical contact with the anode terminal of the battery adjacent the open end of the battery housing.

A radially outwardly directed annular rib is provided about the battery housing adjacent the open end. The annular rib and the cap define an annular slot that is configured to receive a sealing O-ring about the battery housing. The sealing O-ring is made of a resilient, compressible material and forms a tight seal about the opening of the receptacle to protect the battery and the electronics within the electronic receiver. The cap includes an external slot that is configured to receive a tool to assist a user during installation and removal of the battery pack assembly.

The battery pack assembly of the present invention provides a self-contained unit that completely encloses the battery therein so that the terminals of the battery are not directly exposed to the environment outside of the battery housing. The design of the battery pack assembly of the present invention also provides for reliable electrical contact between the battery and the internal electronics of the electronic receiver over an extended period of use.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description of an embodiment given below, serve to explain the principles of the present invention.

DETAILED DESCRIPTION OF THE INVENTION

Figure 1:
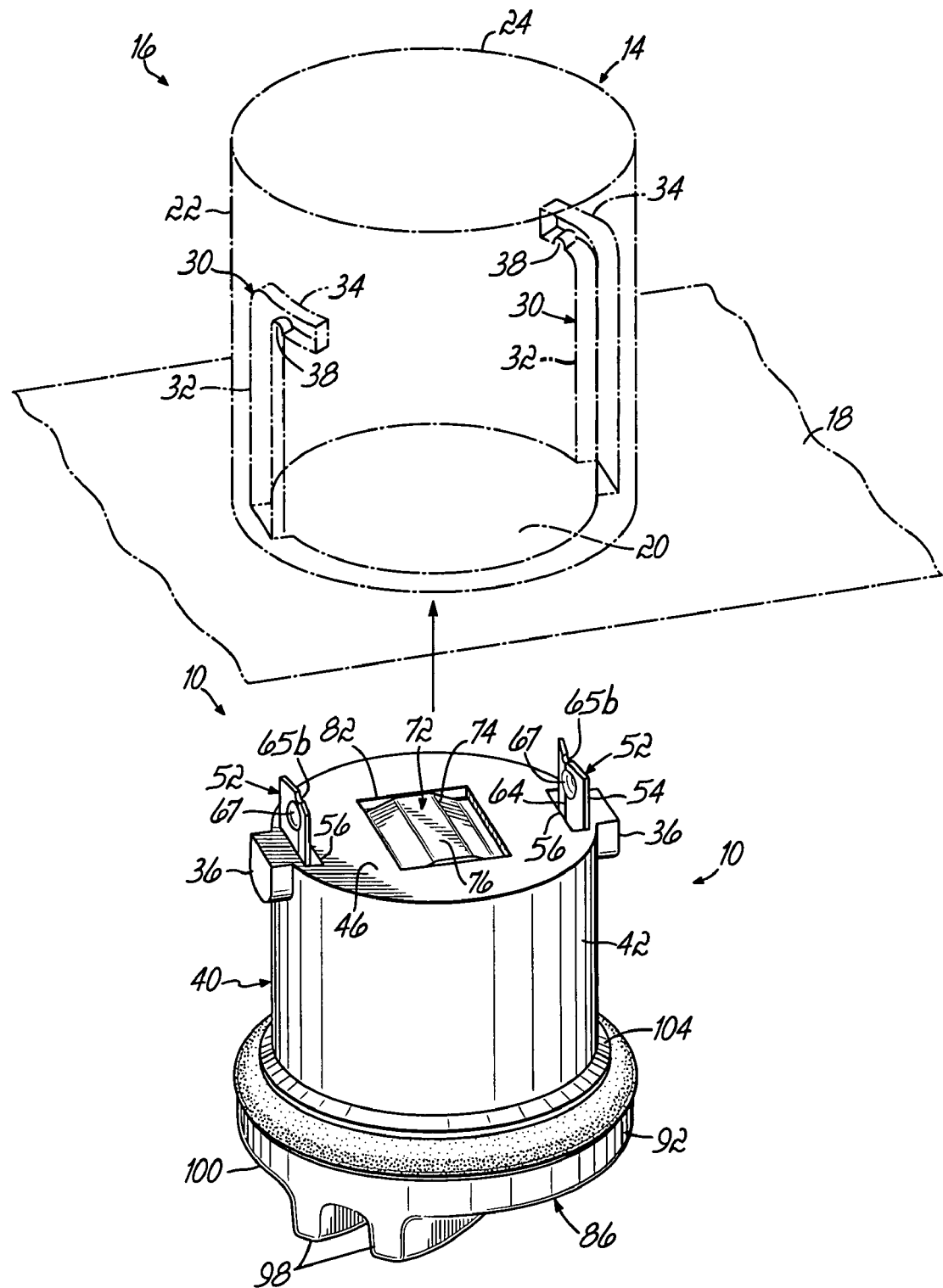
FIG. 1 is a perspective view of a battery pack assembly in accordance with the principles of the present invention, illustrating insertion of the battery pack assembly into a receptacle of an electronic device.

Referring to the figures, and to FIG. 1 in particular, a battery pack assembly 10 is shown in accordance with the principles of the present invention. As will be described in greater detail below, the battery pack assembly 10 is a self-contained unit having a battery 12 therein which is configured to be removably insertable into a receptacle 14 of an electronic device 16, such as, by way of example, an electronic battery-powered receiver used in an animal confinement system. The receiver 16 is carried by an animal and is responsive to a boundary signal emitted from a transmitter (not shown) of the animal confinement system to generate a stimulus, such as an electrical shock, to the animal through electrodes (not shown) when the boundary signal is received. In this way, the animal is contained within the boundary defined by the boundary signal. The present invention will be described by way of example in connection with use of the battery pack assembly 10 in an electronic receiver of an animal confinement system. However, it will be appreciated that the battery pack assembly 10 of the present invention has broader applications for use in other types of electronic devices which are designed to receive power from a battery.

Figure 3A:
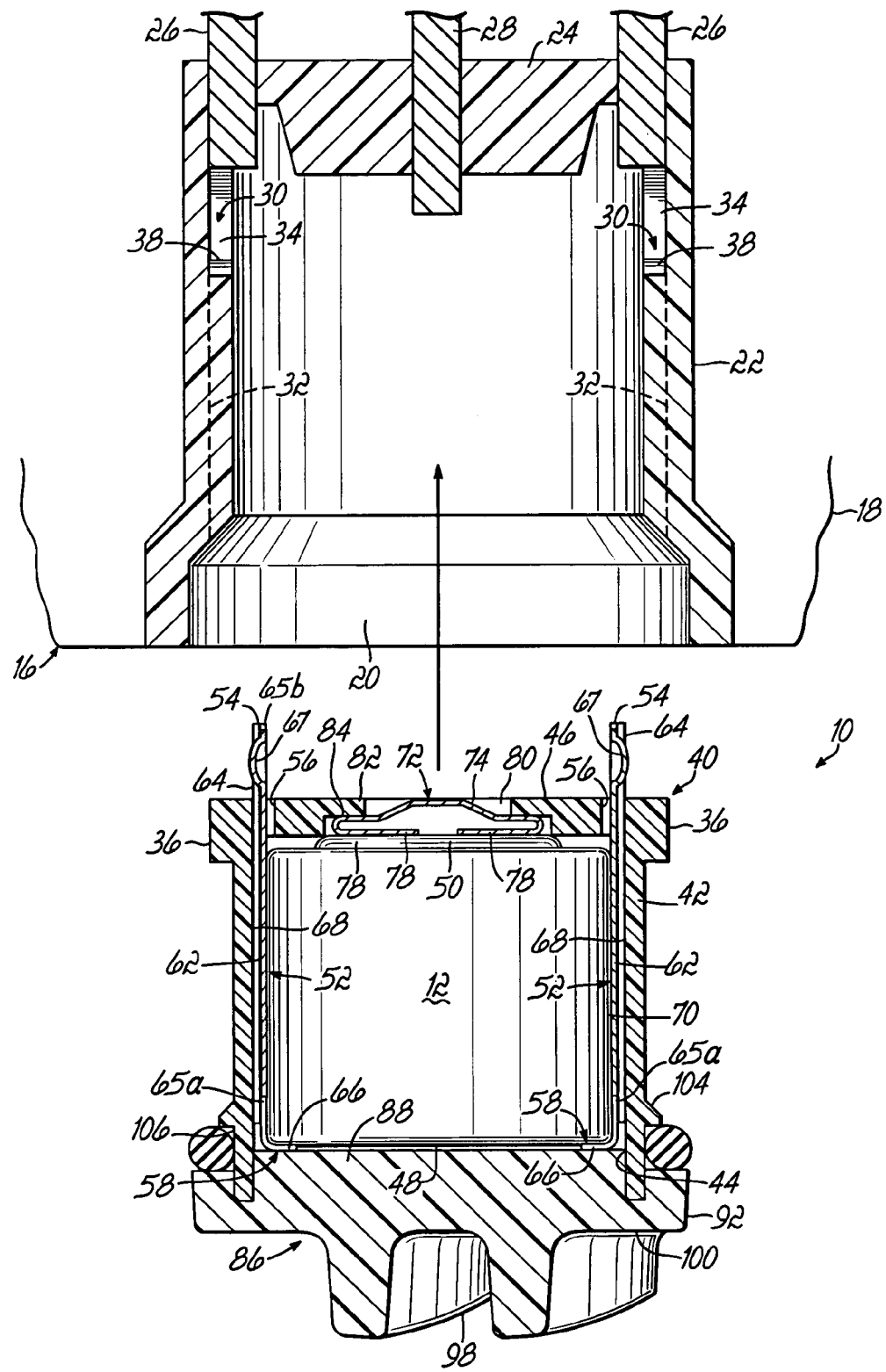
FIG. 3A is an axial cross-sectional view of the battery pack assembly and receptacle shown in FIG. 1, illustrating insertion of the battery pack assembly into the receptacle of the electronic device.
Figure 3B:
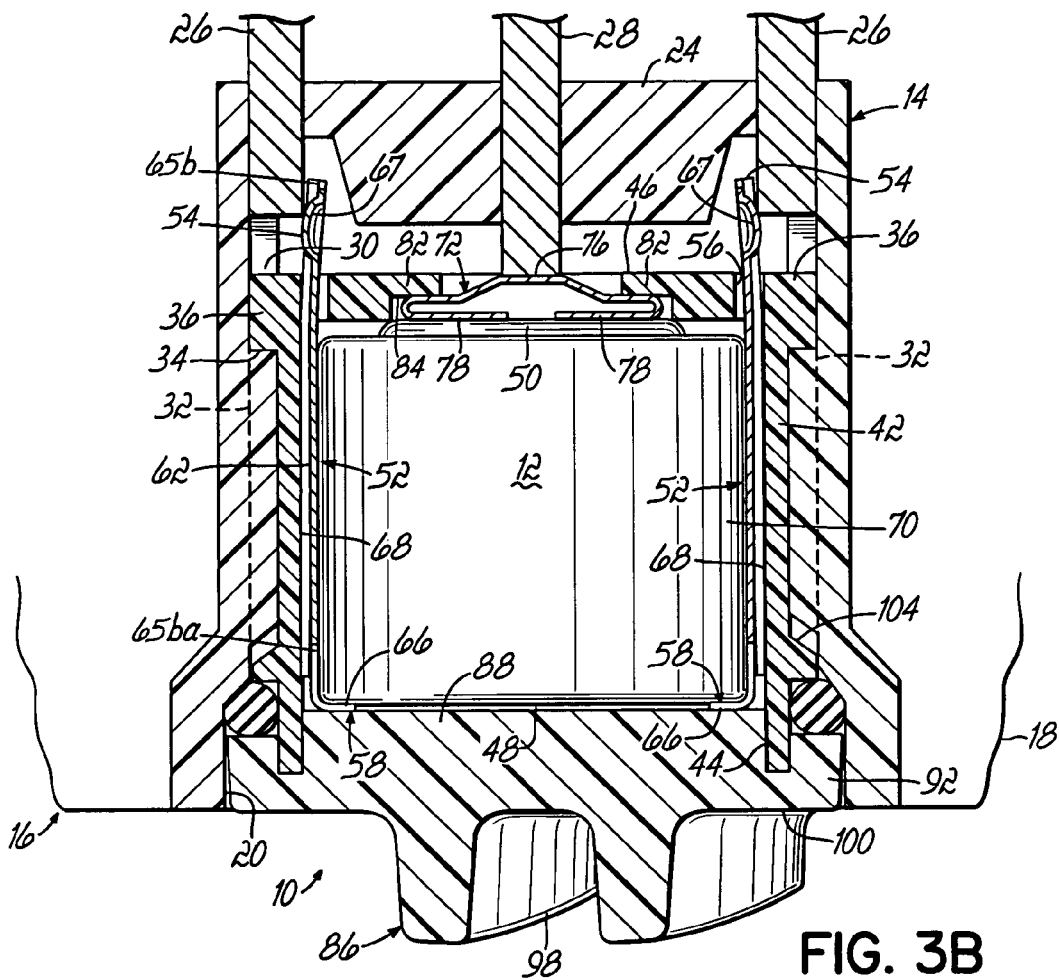
FIG. 3B is a view similar to FIG. 3A, illustrating the battery pack assembly fully inserted into the receptacle of the electronic device.

As shown in FIGS. 1, 3A and 3B, the electronic receiver 16 includes a receiver housing, generally designated 18, having the open-ended receptacle 14 for receiving the battery pack assembly 10 therein through an opening 20 to supply power to internal electronics of the receiver 16. The receptacle 14 is generally cylindrical in shape and is defined by a tubular side wall 22 and a closed base 24 positioned within the interior of the receiver housing 18. A pair of outer electrical contacts 26 and a centrally located electrical contact 28 (FIGS. 3A and 3B) extend into the interior of the receptacle 14 and are configured to electrically connect the battery 12 located within the battery pack assembly 10 to the electronics of the receiver 16.

Further referring to FIGS. 1, 3A and 3B, the battery pack assembly 10 is guided for movement into and out of the receptacle 14 through a pair of guide grooves 30 provided in the tubular side wall 22 of the receptacle 14. The guide grooves 30 are generally L-shaped and are positioned in a generally opposed orientation in the tubular side wall 22 of the receptacle 14. Each guide groove 30 includes a longitudinal groove section 32 that extends parallel to the longitudinal axis of the receptacle 14 from the open end 20 toward the closed base 24. Each guide groove 30 is further defined by a transverse groove section that extends from the longitudinal groove section 32 in a circumferential direction.

The guide grooves 30 are configured to receive and guide a pair of diametrically opposed lugs 36 that extend radially outwardly from the battery pack assembly 10. The guide grooves 30 and the lugs 36 cooperate to permit longitudinal movement of the battery pack assembly 10 into and out of the receptacle 14, and also rotational movement of the battery pack assembly 10 within the receptacle 14 following complete insertion of the battery pack assembly 10 into the receptacle 14. Detents 38 are provided at or near the junctures of the longitudinal groove sections 32 and the transverse groove sections 34 so as to extend partially into the guide grooves 30. The detents 38 cooperate with the lugs 36 to retain the battery pack assembly 10 within the receptacle 14 following full insertion and rotation of the battery pack assembly 10 within the receptacle 14.

Figure 2:
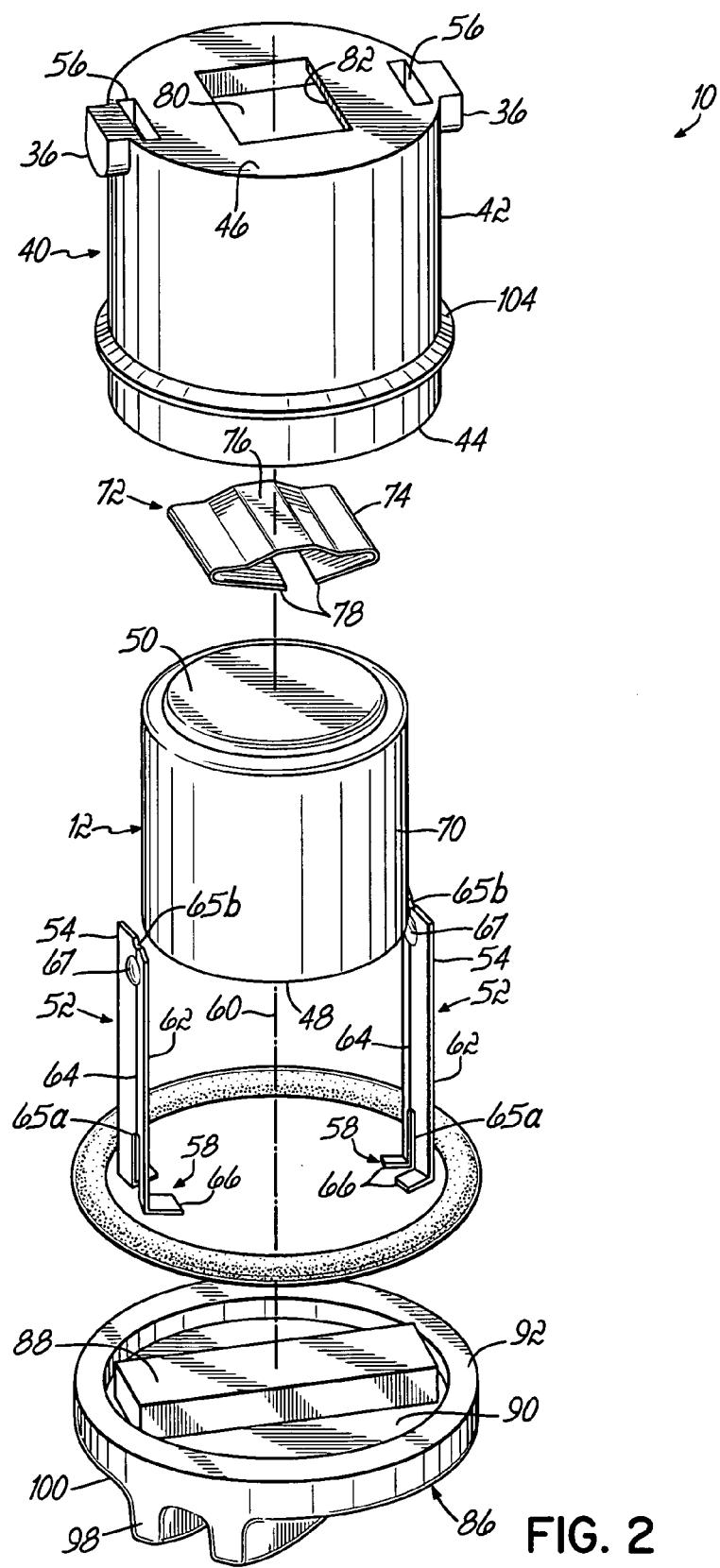
FIG. 2 is a disassembled perspective view of the battery pack assembly shown in FIG. 1.

Referring now to FIGS. 1 and 2, the battery pack assembly 10 includes a cup-shaped battery housing 40 that is defined by a generally tubular side wall 42 having an opening 44 at one end and a generally closed end 46 at the opposite end of the battery 12. The battery housing 40 is configured to receive the battery 12 within the interior of the housing 40 by insertion of the battery 12 through the open end 44 and toward the closed end 46. The battery 12 may be a standard lithium cell battery having an anode terminal 48 at one end and a cathode terminal 50 at the opposite end. The battery housing 40 may be molded of a rigid plastic or any other suitable non-conducting material so that the closed end 46 is integrally formed with the tubular side wall 42. The battery pack assembly 10 is configured to be inserted into the receptacle 14 of the receiver 16 and rotated therein to secure the battery pack assembly 10 within the receptacle 14.

As shown in FIGS. 1, 2, 3A and 3B, the battery pack assembly 10 includes a pair of contact members 52 that are located within the interior of the battery housing 40 and have respective contact ends 54 that extend outwardly of the battery housing 40 through a pair of openings 56 formed through the closed end 46. While a pair of contact members 52 are shown and described, it will be appreciated that only a single contact member 52 may be provided to electrically contact one terminal of the battery 12 as will be described in greater detail below.

In one embodiment, each contact member 52 includes a first section 58 that extends generally transverse to a longitudinal axis 60 (FIG. 2) of the battery pack assembly 10 near the open end 44 and an elongated second section 62 that extends parallel to the longitudinal axis 60 so that the contact members 52 are generally L-shaped. The first and second sections 58, 62 of each contact member 52 may be integrally formed from a single strip of metal so as to be electrically conductive along the entire length of each contact member 52. In one embodiment, the contact members 52 are made from a beryllium copper alloy and have a thickness of about 0.010". The contact members 52 are heat treated after forming to a hardness of about 353 DPM and include a nickel plate finish. Other suitable metal alloys and material thicknesses of the contact members 52 are possible as well.

Figure 4:
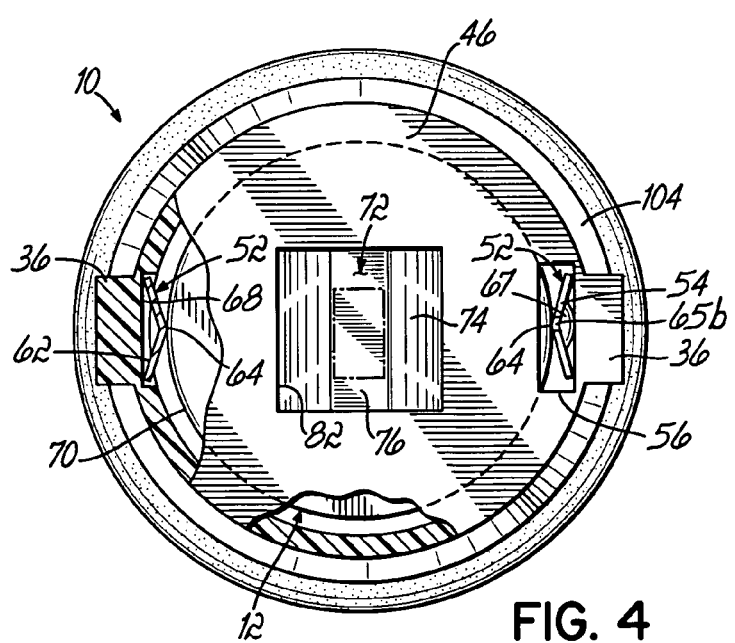
FIG. 4 is a top view, partially in cross-section, of the battery pack assembly shown in FIG. 3B.

As shown in FIG. 4, the second section 62 of each contact member 52 may be slightly bent around a central bending axis 64 (FIG. 2) so as to have a generally V-shaped transverse cross-section as shown in FIG. 4. Notches 65a and 65b are formed in the contact members 52 to facilitate bending of the contact members 52 about the central bending axis 64. The first section 58 of each contact member 52 comprises a pair of inwardly directed contact tabs 66 that are formed by the notch 65a. The contact tabs 66 are bent generally 90° so as to be transverse to the longitudinal axis 60 of the battery pack assembly 10 as shown in FIGS. 3A and 3B. In this way, the contact tabs 66 of the first sections 58 are configured to electrically contact one terminal of the battery 12, such as the battery anode 50, and thereby provide electrical contact with the anode terminal 50 of the battery 12 from outside the battery housing 40 through the outwardly extending contact ends 54 of the contact members 52. The contact ends 54 of the contact members 52 include radially outwardly directed dimples 67 and are configured to electrically contact the outer pair of electrical contacts 26 that extend into the battery receptacle 14 as shown in FIG. 3B.

As shown in FIGS. 3A, 3B and 4, the battery housing 40 includes a pair of diametrically opposed longitudinal grooves 68 formed in the tubular side wall 42 of the battery housing 40. The grooves 68 extend from the open end 44 of the battery housing 40 toward the closed end 46 and communicate with the pair of openings 56 provided in the closed end 46 of the housing 40. The second sections 62 of the contact members 52 are positioned within the respective grooves 68 so that the contact ends 54 of the contact members 52 extend through the openings 56 and outwardly beyond the closed end 46. The second sections 62 are overbent when inserted into the grooves 68 so as to create a pressure contact with the side wall 70 of the battery 12. Of course, it will be appreciated that other configurations of the contact members 52 are possible as well without departing from the spirit and scope of the present invention.

Figure 5:
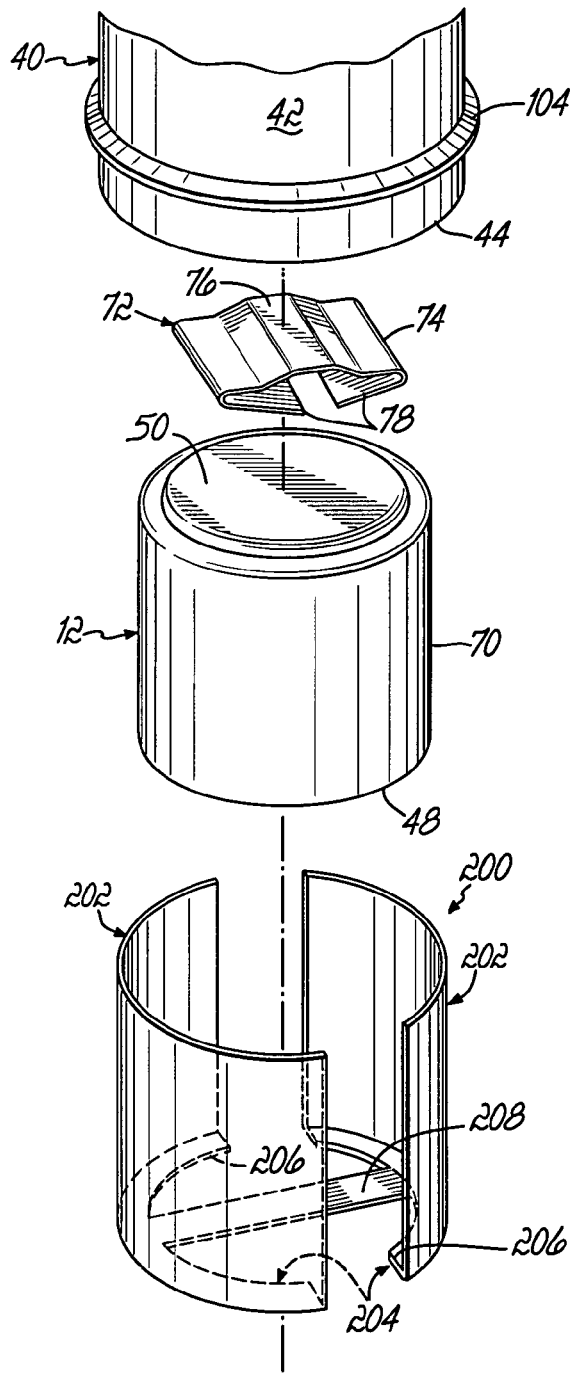
FIG. 5 is an exploded perspective view of a battery pack assembly according to an alternative embodiment of the present invention.
Figure 6:
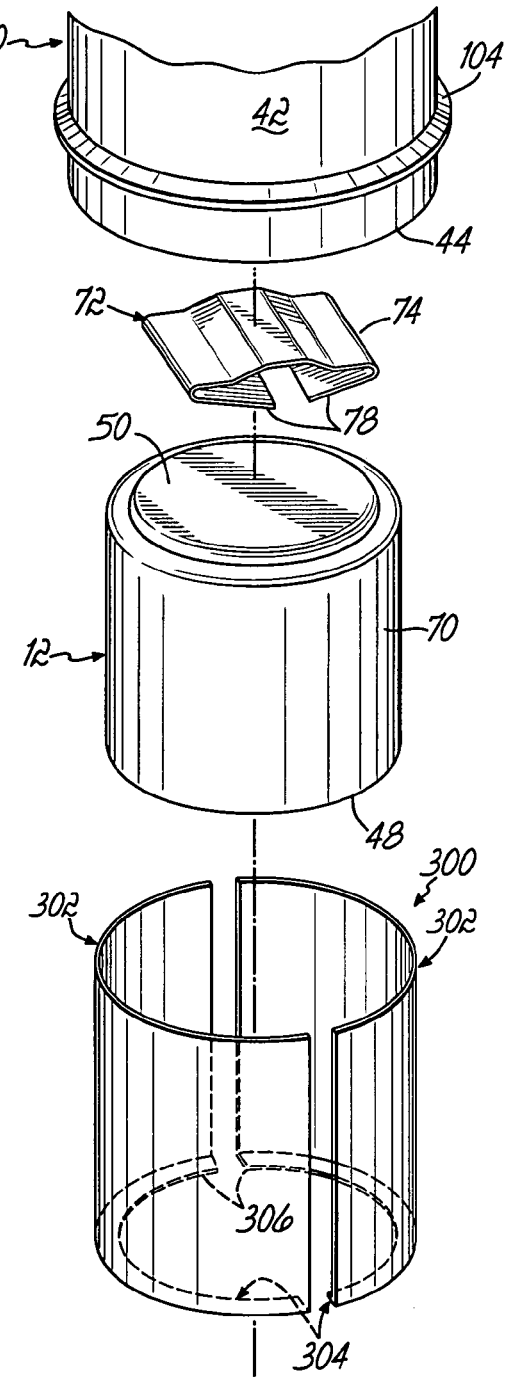
FIG. 6 is an exploded perspective view of a battery pack assembly according to another alternative embodiment of the present invention.

For example, and referring now to FIGS. 5 and 6, alternative embodiments of the contact members 52 are shown. In the alternative embodiment of FIG. 5, a contact member 200 is shown including a pair of elongated arcuate sections 202 each having an inwardly directed arcuate section 204 forming a contact tab 206. Each contact tab 206 extends generally transverse to the longitudinal axis of the battery housing 40. The contact tabs 206 are positioned near the open end 44 of the battery housing 40 and electrically contact the anode terminal 48 of the battery 12. A contact web 208 extends between the pair of contact tabs 206 so that the contact member 200 is a unitary structure. The arcuate sections 204 extend outwardly from the closed end (not shown) of the battery housing 40 and are configured to electrically contact the pair of outer electrical contacts 26 (FIGS. 3A and 3B) extending into the receptacle 14 of the electronic receiver 16.

In the alternative embodiment of FIG. 6, a pair of contact members 300 are shown each having an elongated arcuate section 302 and an inwardly directed arcuate section 304 forming a contact tab 306. Each contact tab 306 extends generally transverse to the longitudinal axis of the battery housing 40. The contact tabs 306 are positioned near the open end 44 of the battery housing 40 and electrically contact the anode terminal 48 of the battery 12. The arcuate sections 302 extend outwardly from the closed end (not shown) of the battery housing 40 and are configured to electrically contact the pair of outer electrical contacts 26 (FIGS. 3A and 3B) extending into the receptacle 14 of the receiver housing 18.

As shown in FIGS. 1, 2, 3A, 3B and 4, the battery pack assembly includes a flexible contact member 72, such as a metal spring, positioned at the closed end 46 of the battery housing 40. In one embodiment, the contact member 72 includes a central web 74 having an outwardly directed dome portion 76 and a pair of contact tabs 78 that are folded beneath the central web 74 adjacent its opposite ends. The pair of contact tabs 78 are flexible relative to the central web 74 and are configured to contact the terminal 50 of the battery 12, such as the battery cathode. The flexible contact tabs 78 are also configured to bias the battery 12 toward the open end 44 of the battery housing 40 such that the opposite terminal 48 of the battery 12, such as the battery anode, is urged into electrical contact with the contact tabs 66 of the L-shaped contact members 52. The pair of flexible contact tabs 78 effectively provides a pair of springs so that the contact tabs 78 are not likely to lose their flexing capability over a period of extended use. It will be appreciated that other configurations of the flexible contact member 72 are possible as well which are operable to electrically contact the battery terminal 50 and bias the battery 12 toward the open end 44 of the battery housing 40 in accordance with the principles of the present invention. In one embodiment, the flexible contact member 72 is made from a beryllium copper alloy and has a thickness of about 0.010". The flexible contact member 72 is heat treated after forming to a hardness of about 353 DPM and includes a nickel plate finish. Other suitable metal alloys and material thicknesses of the flexible contact member 72 are possible as well.

The closed end 46 of the battery housing 40 is provided with a spring seat 80 that includes an opening 82 through the closed end 46 of the battery housing 40. The spring seat 80 includes a pair of recessed shoulders 84 that are formed on opposite sides of the opening 82. The flexible contact member 72 is mounted within the spring seat 80 such that the dome portion 76 extends generally through the opening 82 to provide electrical contact with the terminal 50 of the battery 12 from outside the battery housing 40. The flexible contact member 72 effectively closes the opening 82 such that the cathode terminal 50 of the battery 12 is not directly exposed to the environment outside of the battery housing 40. The dome portion 76 is configured to electrically contact the central electrical contact 28 that extends into the receptacle 14 of the receiver housing 18 as shown in FIG. 3B.

Referring now to FIGS. 1 and 2, the battery pack assembly 10 includes a cap 86 that is sized to cover the open end 44 of the battery housing 40 and extend radially beyond the tubular side wall 42 of the housing 40. As shown in FIG. 2, the cap 86 includes a rectangular boss 88 that extends inwardly from an inner surface 90 (FIG. 2) of the cap 86. The boss 88 is seated or keyed within the pair of opposite longitudinal grooves 68 so as to be in registry with, and contact, the contact tabs 66 of the L-shaped contact members 52. An annular wall 92 extends from the inner surface 90 of the cap 86 in the same direction as the boss 88. As shown in FIGS. 3A and 3B, the cap 86 may be permanently welded or otherwise connected to the open end 44 of the battery housing 40 with the annular wall 92 being positioned about and outwardly of the tubular side wall 42 of the housing 40. Alternatively, the cap 86 may be removably connected to the battery housing 40 such as by screwing, snapping or other removable mounting the cap 86 onto the housing 40. When the cap 86 is connected to the battery housing 40, the boss 88 holds the contact tabs 66 of the L-shaped contact members 52 firmly in electrical contact with the terminal 48 (e.g., anode) of the battery 12.

As shown in FIGS. 1, 2, 3A and 3B, the cap 86 includes a pair of elongated ridges 98 that extend outwardly from an outer surface 100 of the cap 86. The pair of ridges 98 define a slot 102 therebetween that is configured to receive a tool (not shown) to assist the user during insertion and removal of the battery pack assembly 10. The slot 102 is used to permit the battery housing 40 to be rotated in one direction during installation of the battery pack assembly 10 within the receptacle 14 and rotated in an opposite direction during its removal.

Further referring to FIGS. 1, 2, 3A and 3B, a radially outwardly directed annular rib 104 is provided about the battery housing 40 adjacent the open end 44. The annular rib 104 and the annular wall 92 of the cap 86 define an annular slot 106 (FIG. 3A) therebetween that is configured to receive a sealing O-ring 108 about the battery housing 40. The O-ring 108 is made of a compressible, resilient material such as rubber or similar material and may have an outer diameter that is essentially the same as the outer diameter of the cap 86. When the battery pack assembly 10 is fully inserted into the receptacle 14, the O-ring 108 forms a tight seal about the opening 20 of the receptacle 14 to protect the battery 12 and the electronics (not shown) within the receiver housing 18.

During assembly of the battery pack assembly 10 as shown in FIG. 2, the flexible contact member 72 is first mounted within the spring seat 80 with the flexible contact tabs 78 of the contact member 72 projecting into the interior of the battery housing 40. The battery 12 is then inserted through the open end 44 of the battery housing 40 and into the interior of the housing 40 with one battery terminal 50 facing the closed end 46 and the other battery terminal 48 facing the open end 44. In this position, the battery terminal 50 electrically contacts the flexible contact member 72. The pair of L-shaped contact members 52 are then inserted into the longitudinal grooves 68 such that the pair of contact ends 54 extend through the pair of openings 56 and outwardly of the closed end 46 with the contact tabs 66 of the contact members 52 in electrical contact with the opposite battery terminal 48. The sealing O-ring 108 is then positioned about the battery housing 40 adjacent the annular rib 104. Lastly, the cap 86 is connected to the open end 44 of the battery housing 40 with the boss 88 in registry with the contact tabs 66 of the L-shaped contact members 52.

During installation of the battery pack assembly 10 within the receptacle 14, the battery pack assembly 10 is first inserted in a longitudinal direction through the opening 20 of the receptacle 14 with the lugs 36 traveling within the guide grooves 30. An inward force is applied to the battery pack assembly 10 to slightly flex the flexible contact member 72 as it contacts the central electrical contact 28 extending into the interior of the receptacle 14. As the same time, the battery pack assembly 10 is rotated so that the lugs 36 clear the detents 38. Thereafter, the inwardly applied force is removed so that the detents 38 and lugs 36 cooperate to retain the battery pack assembly 10 within the receptacle 14. In this fully inserted position, the pair of L-shaped contact members 52 electrically contact the pair of outer electrical contacts 26 and the flexible contact member 72 electrically contacts the central electrical contact 28 of the electronic receiver 16. The O-ring 108 forms a tight seal about the opening 20 of the receptacle 14.

The battery pack assembly 10 is removed from the receptacle 14 by applying a slight inward force on the battery pack assembly 10 while rotating it in an opposite direction. This permits the lugs 36 to clear the detents 38 so that the battery pack assembly 10 can be fully removed from the receptacle 14.

It will be appreciated that the battery pack assembly 10 of the present invention provides a self-contained unit that completely encloses the battery 12 therein so that the terminals 48, 50 of the battery 12 are not directly exposed to the environment outside of the battery housing 40. The design of the battery pack assembly 10 of the present invention also provides for reliable electrical contact between the battery 12 and the internal electronics of the electronic receiver 16 over an extended period of use.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

Having described the invention, what is claimed is:

1. A battery pack assembly configured to be removably insertable into a receptacle of an electronic device, comprising:

a battery housing having an open end and a generally closed opposite end having an opening therethrough, the battery housing being configured to receive a battery having a pair of opposite terminals therein through the open end;

a first contact member mounted within the housing and configured to electrically contact one terminal of the battery and provide electrical contact with the one terminal of the battery from outside the battery housing;

a flexible second contact member comprising a spring member mounted within the housing and being exposed through the opening, the second contact member being configured to electrically contact the opposite terminal of the battery and provide electrical contact with the opposite terminal of the battery from outside the battery housing, the second contact member further being configured to bias the one terminal of the battery into electrical contact with the first contact member; and a cap member configured to cover the open end of the battery housing.

2. The battery pack assembly of claim 1 wherein the first and second contact members are configured to provide electrical contact with the respective pair of opposite terminals from outside the battery housing at a location adjacent the same end of the battery housing.

3. The battery pack assembly of claim 2 wherein the first and second contact members are configured to provide electrical contact with the respective pair of opposite terminals from outside the battery housing at a location adjacent the closed end of the battery housing.

4. The battery pack assembly of claim 1 wherein the first contact member comprises:

a first portion configured to extend generally perpendicular to a longitudinal axis of the battery housing and electrically contact the one terminal of the battery; and a second portion configured to extend from the first portion in a direction generally parallel to the longitudinal axis the battery housing.

5. The battery pack assembly of claim 4 wherein the second portion is configured to extend outwardly of the battery housing.

6. The battery pack assembly of claim 5 wherein the second portion is configured to extend outwardly of the battery housing at a location adjacent the closed end of the battery housing.

7. The battery pack assembly of claim 4 wherein the second portion is generally V-shaped in cross section.

8. The battery pack assembly of claim 4 wherein the battery housing has an internal groove that extends generally parallel to the longitudinal axis of the battery housing.

9. The battery pack assembly of claim 8 wherein the second portion is at least partially located within the groove.

10. The battery pack assembly of claim 4 wherein the second portion is arcuate in cross section.

11. The battery pack assembly of claim 1 further comprising:

a spring seat formed in the closed end of the battery housing; and wherein the spring member is located within the spring seat.

12. The battery pack assembly of claim 11 wherein the spring member is exposed at the closed end of the battery housing.

13. The battery pack assembly of claim 1 further comprising a sealing ring disposed about the battery housing at a location adjacent the open end of the battery housing.

14. The battery pack assembly of claim 1 further comprising a lug member extending outwardly from the battery housing in a direction generally perpendicular to the longitudinal axis of the battery housing.

15. The battery pack assembly of claim 14 wherein the lug member is provided at a location adjacent the closed end of the battery housing.

16. The battery pack member of claim 4 further comprising a boss member projecting inwardly from the cap member and in contact with the first portion of the first contact member.

17. The battery pack assembly of claim 1 wherein the cap member is affixed to the battery housing adjacent the open end.

18. The battery pack assembly of claim 1 further comprising a battery located within the battery housing.

19. A battery pack assembly configured to be removably insertable into a receptacle of an electronic device, comprising:

a battery housing having an open end and a generally closed opposite end, the battery housing being configured to receive a battery having a pair of opposite terminals therein through the open end;

a first contact member mounted within the housing and configured to electrically contact one terminal of the battery and being exposed adjacent one end of the battery housing;

a flexible second contact member comprising a spring member mounted within the housing configured to electrically contact the opposite terminal of the battery and being exposed through an opening at the one end of the battery housing, the second contact member further being configured to bias the one terminal of the battery into electrical contact with the first contact member; and a cap member configured to cover the open end of the battery housing.

20. The battery pack assembly of claim 19 wherein the first and second contact members are exposed at a location adjacent the closed end of the battery housing.

21. The battery pack assembly of claim 19 wherein the first contact member comprises:

a first portion configured to extend generally perpendicular to a longitudinal axis of the battery housing and electrically contact the one terminal of the battery; and a second portion configured to extend from the first portion in a direction generally parallel to the longitudinal axis the battery housing.

22. The battery pack assembly of claim 19 further comprising:

a spring seat formed in the closed end of the battery housing; and wherein the spring member is located within the spring seat.

23. The battery pack assembly of claim 22 wherein the spring member is exposed at the closed end of the battery housing.

24. The battery pack assembly of claim 19 wherein the cap member is affixed to the battery housing adjacent the open end.

25. The battery pack assembly of claim 19 further comprising a battery located within the battery housing.

26. A battery pack assembly configured to be removably insertable into a receptacle of an electronic device, comprising:

a battery housing having an open end and a generally closed opposite end having an opening therethrough, the battery housing being configured to receive a battery having a pair of opposite terminals therein through the open end;

a first contact member mounted within the housing and configured to electrically contact one terminal of the battery adjacent the open end of the battery housing and extend outwardly from the battery housing adjacent the closed end;

a flexible second contact member comprising a spring member mounted within the housing and being exposed through the opening, the second contact member being configured to electrically contact the opposite terminal of the battery adjacent the closed end of the battery housing and bias the battery toward the open end; and a cap member configured to cover the open end of the battery housing.

27. The battery pack assembly of claim 26 wherein the first and second contact members are configured to provide electrical contact with the respective pair of opposite terminals from outside the battery housing at a location adjacent the closed end of the battery housing.

28. The battery pack assembly of claim 26 wherein the first contact member comprises:

a first portion configured to extend perpendicular to a longitudinal axis of the battery housing and electrically contact the one terminal of the battery; and a second portion configured to extend from the first portion in a direction generally parallel to the longitudinal axis the battery housing.

29. The battery pack assembly of claim 26 further comprising:

a spring seat formed in the closed end of the battery housing; and wherein the spring member is located within the spring seat.

30. The battery pack assembly of claim 29 wherein the spring member is exposed at the closed end of the battery housing.

31. The battery pack assembly of claim 26 wherein the cap member is affixed to the battery housing adjacent the open end.

32. The battery pack assembly of claim 26 further comprising a battery located within the battery housing.

33. A battery pack assembly configured to be removably insertable into a receptacle of an electronic device, comprising:

a battery housing having an open end and a generally closed opposite end having an opening therethrough, the battery housing being configured to receive a battery having a pair of opposite terminals therein through the open end;

a first contact member mounted within the housing and configured to electrically contact one terminal of the battery adjacent the open end of the battery housing and being exposed adjacent the closed end;

a flexible second contact member comprising a spring member mounted within the housing and being exposed through the opening, the second contact member being configured to electrically contact the opposite terminal of the battery adjacent the closed end of the battery housing, the second contact member further being configured to bias the battery toward the open end; and a cap member configured to cover the open end of the battery housing.

34. The battery pack assembly of claim 33 wherein the first contact member comprises:

a first portion configured to extend generally perpendicular to a longitudinal axis of the battery housing and electrically contact the one terminal of the battery; and a second portion configured to extend from the first portion in a direction generally parallel to the longitudinal axis the battery housing.

35. The battery pack assembly of claim 33 further comprising:

a spring seat formed in the closed end of the battery housing; and wherein the spring member is located within the spring seat.

36. The battery pack assembly of claim 33 wherein the cap member is affixed to the battery housing adjacent the open end.

37. The battery pack assembly of claim 33 further comprising a battery located within the battery housing.

* * * * *

UNITED STATES PATENT AND TRADEMARK OFFICE
CERTIFICATE OF CORRECTION

PATENT NO. : 7,709,136 B2 Page 1 of 1
APPLICATION NO. : 11/174245
DATED : May 4, 2010
INVENTOR(S) : Touchton et al.

It is certified that error appears in the above-identified patent and that said Letters Patent is hereby corrected as shown below:

In column 8, line 54, change "it is not the intention of applicant to restrict" to --it is not the intention of applicants to restrict--.

In claim 21, column 10, line 46, change "to the longitudinal axis the battery housing." to --to the longitudinal axis of the battery housing.--.

Signed and Sealed this

Thirty-first Day of August, 2010

David J. Kappos
*Director of the United States Patent and Trademark Office*